United States Patent [19]

Stubaus

[11] Patent Number: 5,330,266
[45] Date of Patent: Jul. 19, 1994

[54] CAPPUCCINO ATTACHMENT FOR AN ESPRESSO MACHINE

[76] Inventor: Leslie H. Stubaus, 68 W. Main St., Bogota, N.J. 07603

[21] Appl. No.: 136,891

[22] Filed: Oct. 18, 1993

[51] Int. Cl.$^5$ .................... B01F 13/02; A47J 31/40
[52] U.S. Cl. .................... 366/101; 99/293; 99/323.1; 261/DIG. 76
[58] Field of Search ............ 366/101, 106, 107, 340, 366/336; 99/293, 323.1, 323.3; 261/DIG. 16, DIG. 76

[56] References Cited

U.S. PATENT DOCUMENTS

| | | | |
|---|---|---|---|
| 4,735,133 | 4/1988 | Paoletti | 366/176 |
| 4,852,474 | 8/1989 | Mahlich | 261/DIG. 76 |
| 4,945,824 | 8/1990 | Borgmann | 99/293 |
| 4,960,042 | 10/1990 | Grossi | 99/293 |

*Primary Examiner*—Robert W. Jenkins
*Attorney, Agent, or Firm*—Hugh E. Smith

[57] ABSTRACT

A cappuccino attachment for an espresso machine, the attachment comprising an upper frother body having a threaded upper opening, a threaded lower opening, and an aperture formed adjacent the upper opening; an extension having a first end coupled with the upper frother body, and a second end opposite the first end, a first aperture formed within the second end, a second aperture formed through the extension; an internal passage providing a fluid interconnection between the upper opening, the lower opening, the first aperture, and the second aperture, the passage being threaded adjacent the lower opening; an air intake adjustment mechanism having a cylindrical member with a hollow interior, the cylindrical member having a first end connected with the second end of the extension, the air intake adjustment mechanism operatively engaged with the hollow interior of the cylindrical member and functioning to control the amount of air passing into the internal passage; a hollow frothing tunnel having a threaded upper opening adapted to be connected with the threads of the passage adjacent the lower opening of the upper frother body, the frothing tunnel functioning a aerate passing fluids; a lower frother body having a threaded upper opening and a lower aperture, the threaded upper opening of the lower frother body adapted to be connected to the threaded lower opening of the upper frother body; and a steam valve attachment assembly adapted to couple the upper frother body with a steam valve assembly.

3 Claims, 4 Drawing Sheets

CAPPUCCINO ATTACHMENT FOR AN ESPRESSO MACHINE

BACKGROUND OF THE INVENTION

1. Field of the Invention

The present invention relates to a cappuccino attachment for an espresso machine and more particularly pertains to an attachment for combining steam, milk, and air to produce aerated milk.

2. Description of the Prior Art

The use of frothing devices is known in the prior art. More specifically, devices for frothing milk are known to consist basically of familiar, expected and obvious structural configurations, notwithstanding the myriad of designs encompassed by the crowded prior art which have been developed for the fulfillment of countless objectives and requirements.

For example, U.S. Pat. No. 4,960,042 discloses a device for frothing and heating milk for beverages. The device includes a steam outlet tube and a milk intake tube.

U.S. Pat. No. 4,922,810 discloses an automatic device for obtaining frothy milk. The device includes a milk feeding duct and a nozzle for pressurized steam.

U.S. Pat. No. 4,735,133 discloses a milk heating and emulsifying device for the preparation of cappuccino. The device includes a passageway for admitting sucked-in air and one passageway for milk.

U.S. Pat. No. 4,945,824 discloses a cappuccino making adapted for use with a coffee maker. The adapter includes a first inlet for the discharge end of a steam-supplying conduit and a second inlet for the discharge end of an air supplying device.

Furthermore, U.S. Pat. No. 4,852,474 discloses an espresso machine with a cappuccino making attachment. The espresso machine includes a steam supplying first conduit and a second conduit having an air admitting inlet.

While these frothing devices fulfill their respective, particular objectives and requirements, the aforementioned patents do not describe a cappuccino attachment device with an air intake adjustment mechanism. Furthermore, the aforementioned patents do not describe a cappuccino attachment device with a steam valve attachment assembly. Additionally, the aforementioned patents do not describe such a cappuccino attachment device which is constructed solely from metal.

In this respect, the cappuccino attachment device according to the present invention substantially departs from the conventional concepts and designs of the prior art, and in so doing provides an attachment device with an integral air intake adjustment mechanism and steam valve attachment assembly.

Therefore, it can be appreciated that there exists a continuing need for new and improved cappuccino attachment for an espresso machine which can be used for the convenient and reliable making of cappuccino. In this regard, the present invention substantially fulfills this need.

SUMMARY OF THE INVENTION

In view of the foregoing disadvantages inherent in the known types of cappuccino makers now present in the prior art, the present invention provides an improved cappuccino attachment for an espresso machine. As such, the general purpose of the present invention, which will be described subsequently in greater detail, is to provide a new and improved cappuccino attachment for an espresso machine and method which has all the advantages of the prior art and none of the disadvantages.

To attain this, the present invention essentially comprises a cappuccino attachment for an espresso machine, the attachment comprising, in combination an upper frother body having an internally threaded upper opening, an externally threaded Lower opening, and an aperture formed adjacent the upper opening; cylindrical extension having a first end integral with the frother body intermediate its upper and lower openings, and a second end opposite the first end, a first aperture formed within the second end, a second aperture formed through the cylindrical extension intermediate the first and second ends of the cylindrical extension; an internal passage providing a fluid interconnection between the upper opening of the frother body, the lower opening of the upper frother body, the first aperture of the cylindrical extension, and the second aperture of the cylindrical extension, the passage being internally threaded adjacent the lower opening of the upper frother body; an air intake adjustment mechanism having a cylindrical member with a hollow interior, the cylindrical member having a diameter less than the diameter of the cylindrical extension, the cylindrical member having a first end connected with the second end of the cylindrical extension, the air intake adjustment mechanism including a conical air adjustment screw operatively engaged with the hollow interior of the cylindrical member, the screw functioning to control the amount of air passing into the internal passage; a hollow frothing tunnel having an externally threaded upper opening adapted to be connected with the internal threads of the passage adjacent the lower opening of the upper frother body, the hollow frothing tunnel having a plurality of apertures formed within its surface, the frothing tunnel functioning to aerate passing fluids; a lower frother body having an internally threaded upper opening, and a lower aperture, the internally threaded upper opening of the lower frother body adapted to be connected to the externally threaded lower opening of the upper frother body; a steam valve attachment assembly, the assembly including a locking screw positioned through the aperture of the upper frother body, and an O-ring seal positioned about the internal passage below the locking screw, the attachment assembly adapted to engage a steam valve assembly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cappuccino attachment for an espresso machine which has all the advantages of the prior art cappuccino makers and none of the disadvantages.

It is another object of the present invention to provide a new and improved cappuccino attachment for an espresso machine which may be easily and efficiently manufactured and marketed.

It is a further object of the present invention to provide a new and improved cappuccino attachment for an espresso machine which is of a durable and reliable construction.

An even further object of the present invention is to provide a new and improved cappuccino attachment for an espresso machine which is susceptible of a low cost of manufacture with regard to both materials and labor, and which accordingly is then susceptible of low prices of sale to the consuming public, thereby making such cappuccino attachments for espresso machines economically available to the buying public.

Still yet another object of the present invention is to provide a new and improved cappuccino attachment for an espresso machine which provides in the apparatuses and methods of the prior art some of the advantages thereof, while simultaneously overcoming some of the disadvantages normally associated therewith.

Still another object of the present invention is to make cappuccino conveniently.

Yet another object of the present invention is to combine steam, milk, and air for producing aerated milk.

Even still another object of the present invention is to provide a new and improved cappuccino attachment for an espresso machine, the attachment comprising an upper frother body having a threaded upper opening, a threaded lower opening, and an aperture formed adjacent the upper opening; an extension having a first end coupled with the upper frother body, and a second end opposite the first end, a first aperture formed within the second end, a second aperture formed through the extension; an internal passage providing a fluid interconnection between the upper opening, the lower opening, the first aperture, and the second aperture, the passage being threaded adjacent the lower opening; an air intake adjustment mechanism having a cylindrical member with a hollow interior, the cylindrical member having a first end connected with the second end of the extension, the air intake adjustment mechanism operatively engaged with the hollow interior of the cylindrical member and functioning to control the amount of air passing into the internal passage; a hollow frothing tunnel having a threaded upper opening adapted to be connected with the threads of the passage adjacent the lower opening of the upper frother body, the frothing tunnel functioning a aerate passing fluids; a lower frother body having a threaded upper opening and a lower aperture, the threaded upper opening of the lower frother body adapted to be connected to the threaded lower opening of the upper frother body; and a steam valve attachment assembly adapted to couple the upper frother body with a steam valve assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
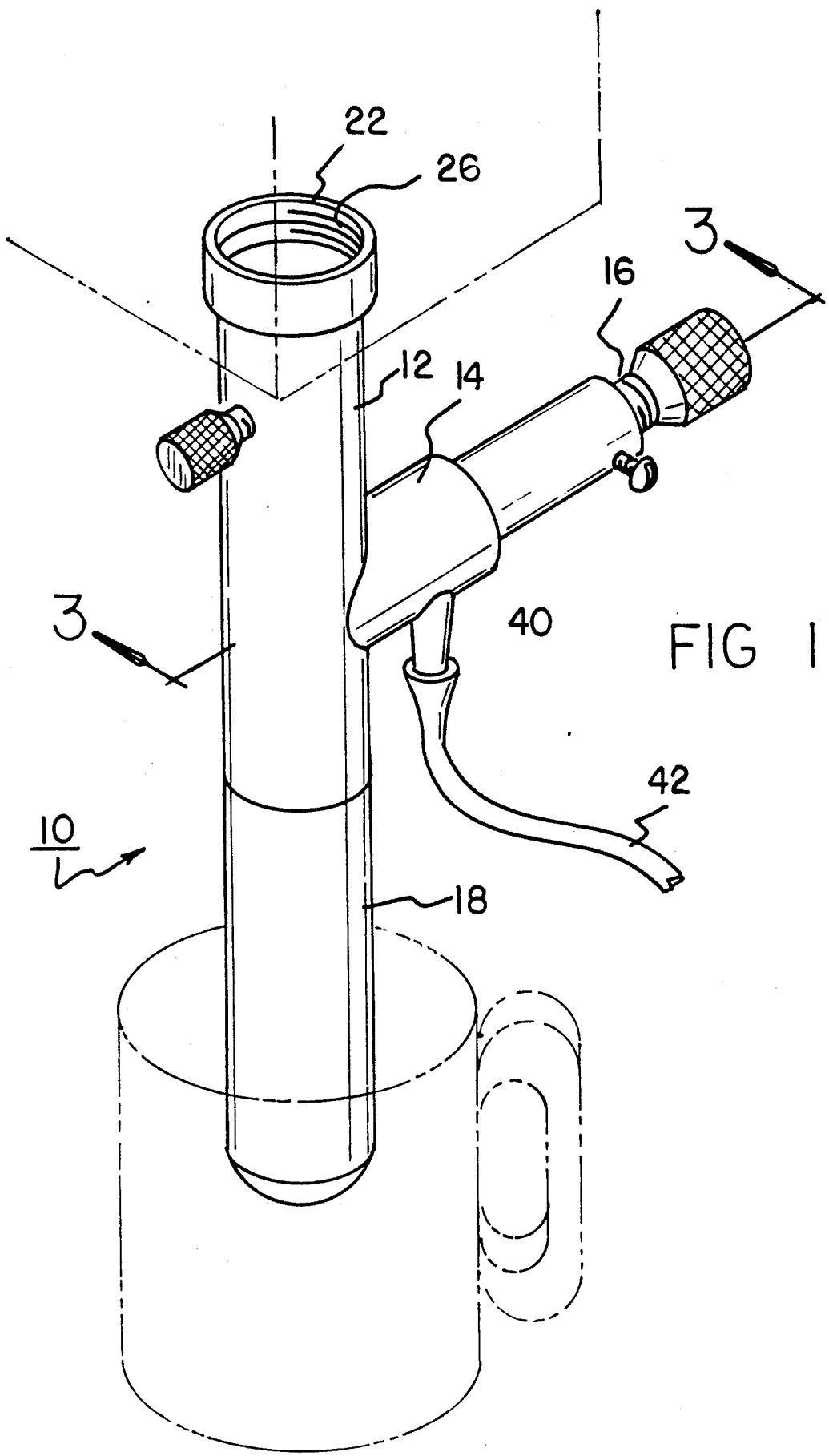
FIG. 1 is a perspective view of a cappuccino attachment for an espresso machine constructed in accordance with the principles of the present invention.
Figure 2:
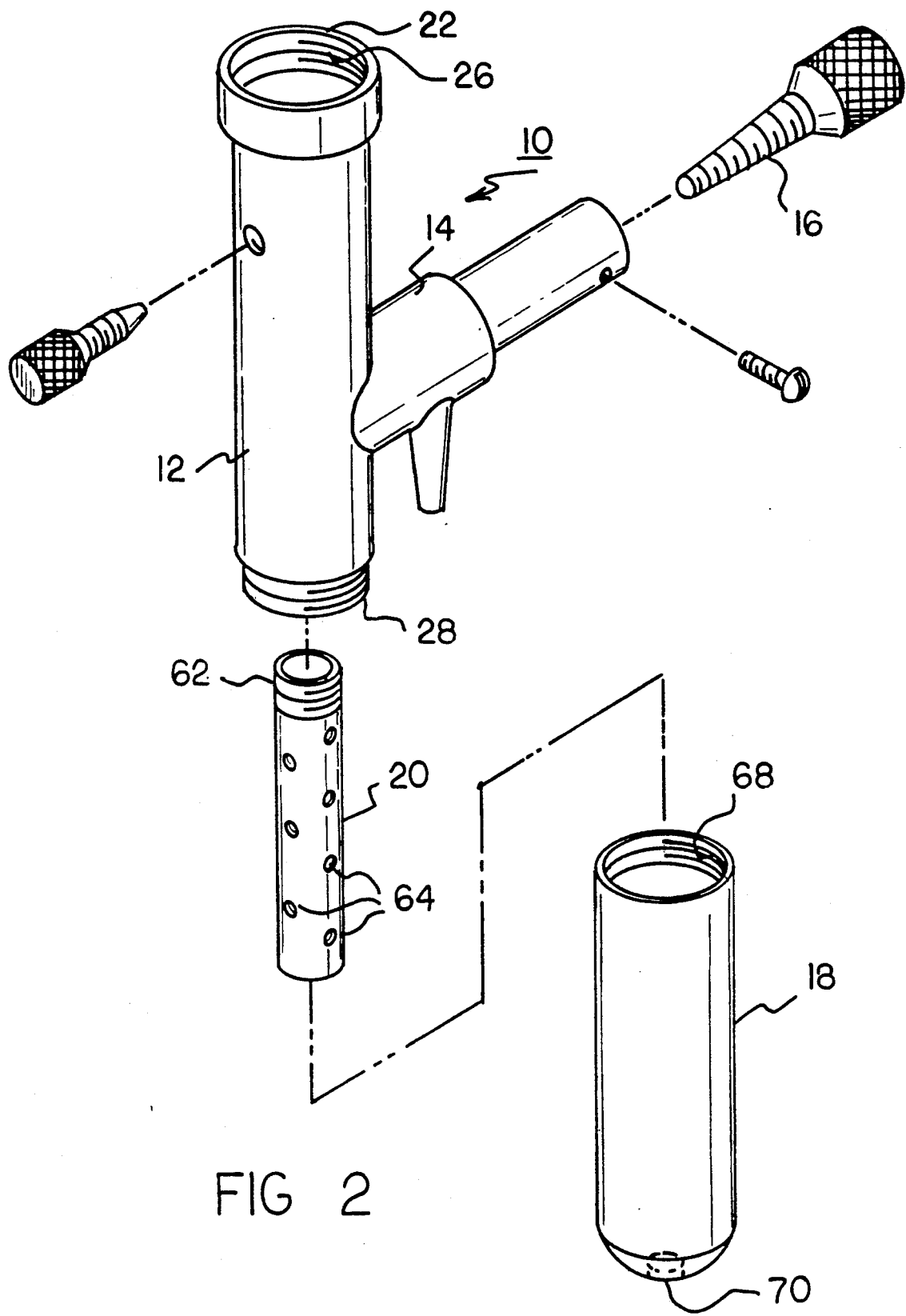
FIG. 2 is an exploded perspective view of the device of FIG. 1.
Figure 3:
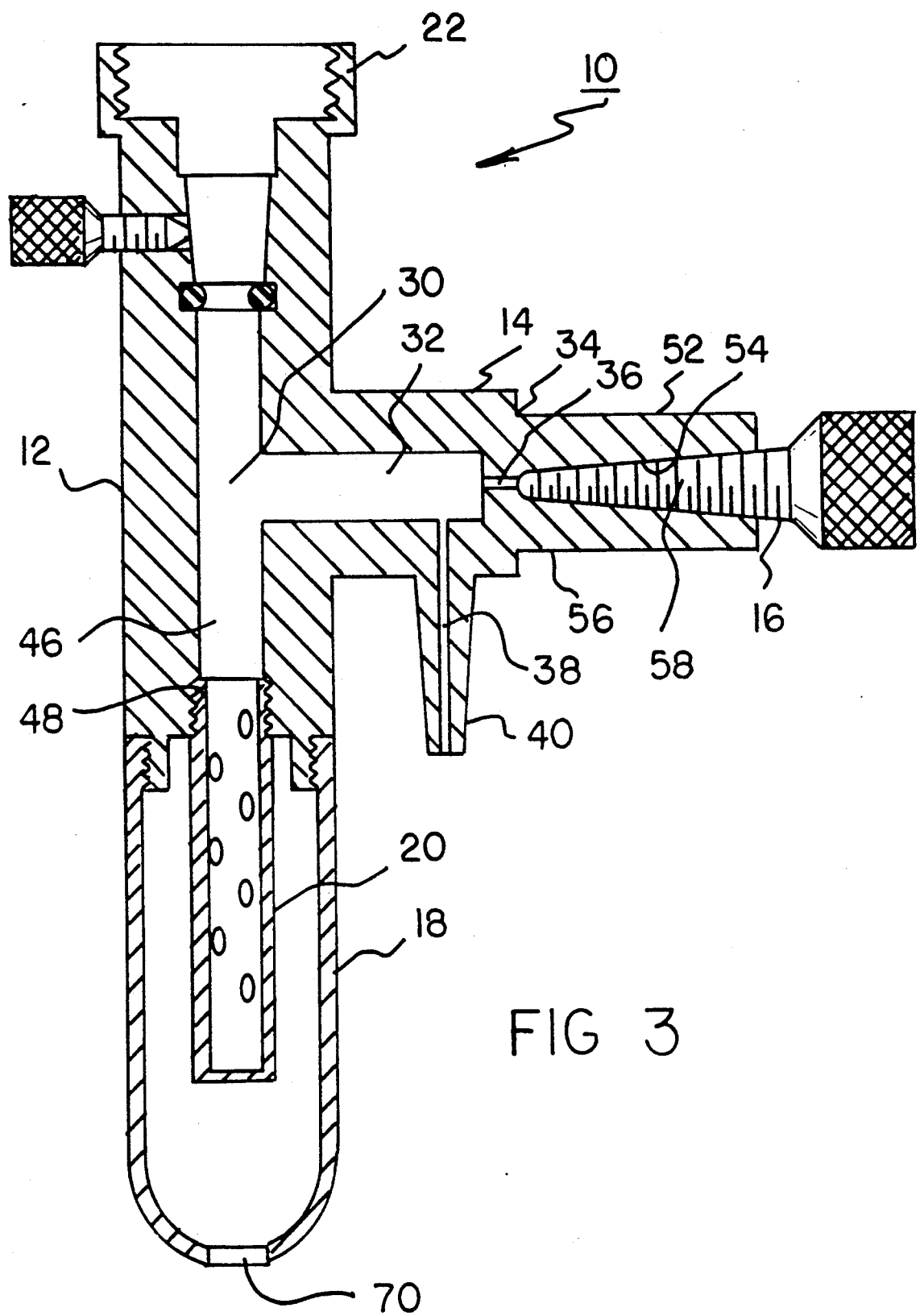
FIG. 3 is a sectional view taken along line 3—3 of FIG. 1.

With reference now to the drawings, and in particular to FIG. 1 thereof, a new and improved cappuccino attachment for an espresso machine embodying the principles and concepts of the present invention and generally designated by the reference numeral 10 will be described.

The present invention relates to a cappuccino attachment 10 for an espresso machine, not shown. The attachment designed to provide aerated milk to a cup of espresso. It is within the context of the present invention to substitute any other suitable dairy product for the milk. The attachment operates by combining steam, air and milk and producing aerated milk. In its broadest context, the attachment includes an upper frother body 12, a cylindrical extension 14 for the milk intake, an air intake adjustment mechanism 16, a lower frother body 18, a frothing tunnel 20, and a steam valve attachment mechanism 22.

The upper frother body 12 is designed to route incoming steam, milk, and air into the lower frother body 18. The upper frother body 12 includes an internally threaded upper opening 26 for the intake of steam, an externally threaded lower opening 28, and an aperture 30 formed adjacent the upper opening. Connected with the upper frother body is a cylindrical extension 14. The cylindrical extension 14 is adapted to deliver milk into the upper frother body. The cylindrical extension 14 includes a first end 32 integral with the frother body at a point intermediate its upper and lower openings. The cylindrical extension further includes a second end 34 opposite the first end. The cylindrical extension further includes a first aperture 36 formed within its second end, a second aperture 38 formed intermediate its first and second ends. The second aperture 38 of the cylindrical extension is the milk input aperture. The second aperture can be coupled to an appropriate nozzle 40 to facilitate its attachment to an external source of milk as through a tube 42.

An internal passage 46 provides a fluid interconnection between the upper opening of the upper frother body, the lower opening of the upper frother body, the first aperture of the cylindrical extension, and the second aperture of the cylindrical extension. Furthermore, the passage includes an internally threaded segment 48 adjacent the lower opening of the upper frother body.

An air intake adjustment mechanism 16 is included with the cappuccino attachment for controlling the amount of air that is delivered into the internal passage. The intake adjustment mechanism includes a cylindrical member 52 with a hollow interior 4. The cylindrical member 52 has a diameter less than the diameter of the cylindrical extension 14. The cylindrical member 2 has a first end 56 connected with the second end 34 of the cylindrical extension. Furthermore, the air intake adjustment mechanism includes a conical air adjustment screw 58 operatively engaged with the hollow interior 54 of the cylindrical member. Thus, the position of the screw within the cylindrical member can be selected to control the amount of air delivered through aperture 36 into the passage 46.

A hollow frothing tunnel 20 is included with the cappuccino attachment and serves to aerate passing milk. The hollow frothing tunnel 20 includes an externally threaded upper opening 62 adapted to be connected with the internal threads 48 of the passage adjacent the lower opening of the upper frother body. The hollow frothing tunnel further including a number of apertures 64 formed within its surface. The apertures 64 serve to aerate passing fluids. The frothing tunnel 20 can incorporate other aerating devices such as fins and veins. The hollow frothing tunnel is designed to be housed within the lower frother body 18. The lower frother body includes an internally threaded upper opening 68, and a lower aperture 70, with the internally threaded upper opening 68 adapted to be connected to the externally threaded lower opening 28 of the upper frother body 12.

A steam valve attachment assembly 22 is included within the cappuccino attachment to facilitate its connection to a steam valve assembly, not shown. The steam valve attachment assembly 22 includes a locking screw 74 positioned through the aperture 76 of the upper frother body 12, and an O-ring seal 78 positioned about the internal passage below the locking screw 74. Thus, a steam valve assembly can be secured to the upper frother body 12 by the locking screw 74, and a fluid tight seal between the frother body and valve assembly can be achieved by the O-ring seal 78.

The second embodiment of the attachment is substantially the same as that of the first. However, an opening 82 is formed within the lower frother body 84 intermediate is upper opening and lower aperture. Furthermore, an L-shaped tube 86 is coupled to the opening of the lower frother body and serves to route fluids from a bottle 88 into the lower frother body 84. The L-shaped tube 86 has a horizontal extent 89 and a vertical extent 90, with the horizontal extent 89 including an opening 90 adapted to be connected with the opening of the lower frother body. The vertical extent 90 of the L-shaped tube 86 including a threaded opening 92 adapted to be connected to the bottle 88.

Figure 4:
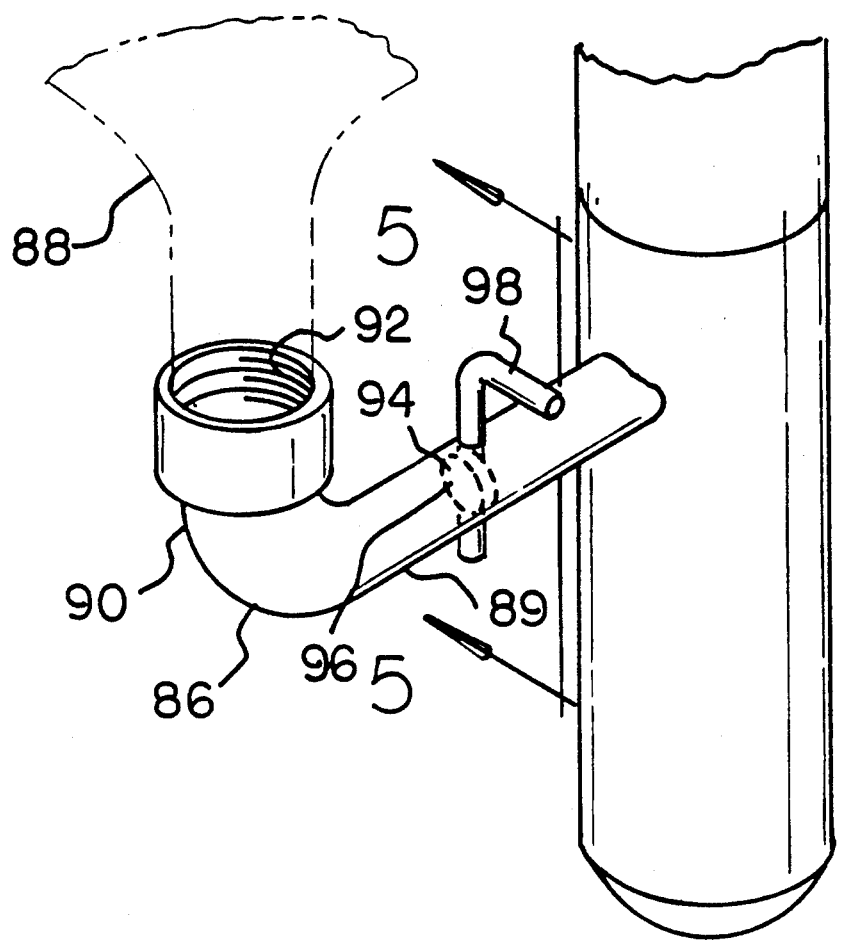
FIG. 4 is an enlarged perspective view of an alternate embodiment of the invention.
Figure 5:
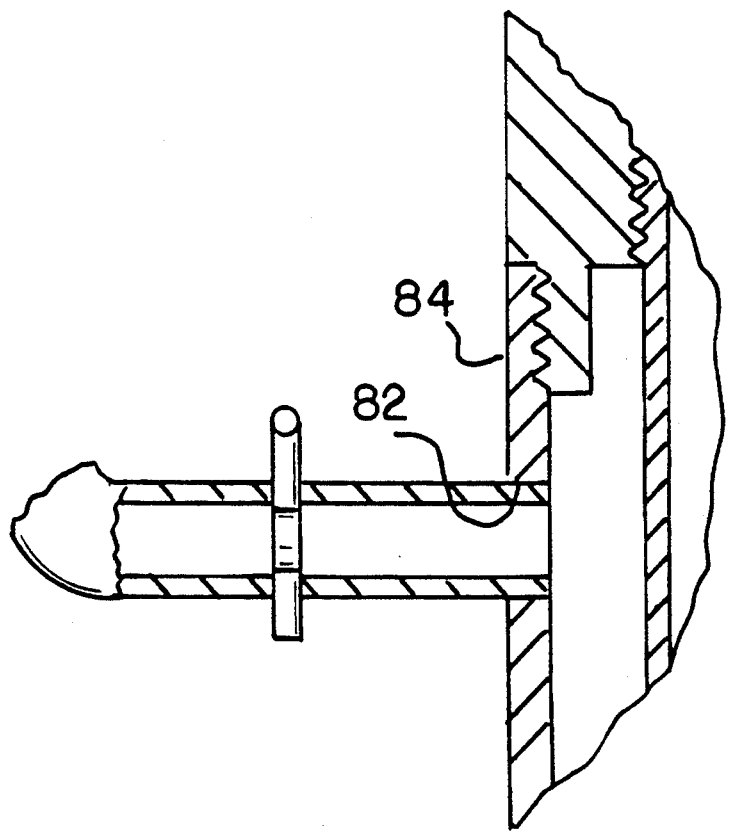
FIG. 5 is a sectional view taken along line 5—5 of FIG. 4.

The second embodiment further includes shut-off valve 94 positioned within the horizontal extent 89 of the L-shaped tube. The shut-off valve has a circular plate 96 movable between a position shown in FIGS. 4 and 5 to close the flow of fluid and any alternate position to allow a selected flow of fluid by pivoting bar 98 coupled to the plate. This arrangement serves to control the amount of fluid being delivered into the lower frother body. In use, an operator of the cappuccino attachment would couple a bottle of liquor to the threaded portion of the L-shaped tube. The operator would then select a valve setting to determine the amount of liquor to be delivered to the lower frother body. In this manner, liquor, or any other liquid could be directly added to the cappuccino.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A cappuccino attachment for an espresso machine, the attachment comprising, in combination:
   an upper frother body having an internally threaded upper opening, an externally threaded lower opening, and an aperture formed adjacent the upper opening;
   a cylindrical extension having a first end integral with the frother body intermediate its upper and lower openings, and a second end opposite the first end, a first aperture formed within the second end, a second aperture formed through the cylindrical extension intermediate the first and second ends of the cylindrical extension;
   an internal passage providing a fluid interconnection between the upper opening of the frother body, the lower opening of the upper frother body, the first aperture of the cylindrical extension, and the second aperture of the cylindrical extension, the passage being internally threaded adjacent the lower opening of the upper frother body;

an air intake adjustment mechanism having a cylindrical member with a hollow interior, the cylindrical member having a diameter less than the diameter of the cylindrical extension, the cylindrical member having a first end connected with the second end of the cylindrical extension, the air intake adjustment mechanism including a conical air adjustment screw operatively engaged with the hollow interior of the cylindrical member, the screw functioning to control the amount of air passing into the internal passage;

a hollow frothing tunnel having an externally threaded upper opening adapted to be connected with the internal threads of the passage adjacent the lower opening of the upper frother body, the hollow frothing tunnel having a plurality of apertures formed within its surface, the frothing tunnel functioning to aerate passing fluids;

a lower frother body having an internally threaded upper opening, and a lower aperture, the internally threaded upper opening of the lower frother body adapted to be connected to the externally threaded lower opening of the upper frother body;

a steam valve attachment assembly, the assembly including a locking screw positioned through the aperture of the upper frother body, and an O-ring seal positioned about the internal passage below the locking screw, the attachment assembly adapted to engage a steam valve assembly.

2. A cappuccino attachment for an espresso machine, the attachment comprising:

an upper frother body having a threaded upper opening, a threaded lower opening, and an aperture formed adjacent the upper opening;

an extension having a first end coupled with the upper frother body, and a second end opposite the first end, a first aperture formed within the second end, a second aperture formed through the extension;

an internal passage providing a fluid interconnection between the upper opening, the lower opening, the first aperture, and the second aperture, the passage being threaded adjacent the lower opening;

an air intake adjustment mechanism having a cylindrical member with a hollow interior, the cylindrical member having a first end connected with the second end of the extension, the air intake adjustment mechanism operatively engaged with the hollow interior of the cylindrical member and functioning to control the amount of air passing into the internal passage;

a hollow frothing tunnel having a threaded upper opening adapted to be connected with the threads of the passage adjacent the lower opening of the upper frother body, the frothing tunnel functioning a aerate passing fluids;

a lower frother body having a threaded upper opening and a lower aperture, the threaded upper opening of the lower frother body adapted to be connected to the threaded lower opening of the upper frother body; and a steam valve attachment assembly adapted to couple the upper frother body with a steam valve assembly.

3. The attachment of claim 2 and further comprising:

an opening formed within the lower frother body intermediate the upper opening and the lower aperture;

an L-shaped tube adapted to route fluids from a bottle into the lower frother body, the L-shaped tube having a horizontal extent and a vertical extent, the horizontal extent having an opening adapted to be connected with the opening of the lower frother body, the vertical extent having a threaded opening adapted to be connected to a bottle; and a shut-off valve positioned within the horizontal extent of the L-shaped tube, the valve serving to control the amount of fluid being delivered into the lower frother body.

* * * * *